I. ROSENFIELD.
RESILIENT WHEEL.
APPLICATION FILED OCT. 19, 1916. RENEWED MAR. 1, 1919.
1,317,729.
Patented Oct. 7, 1919.
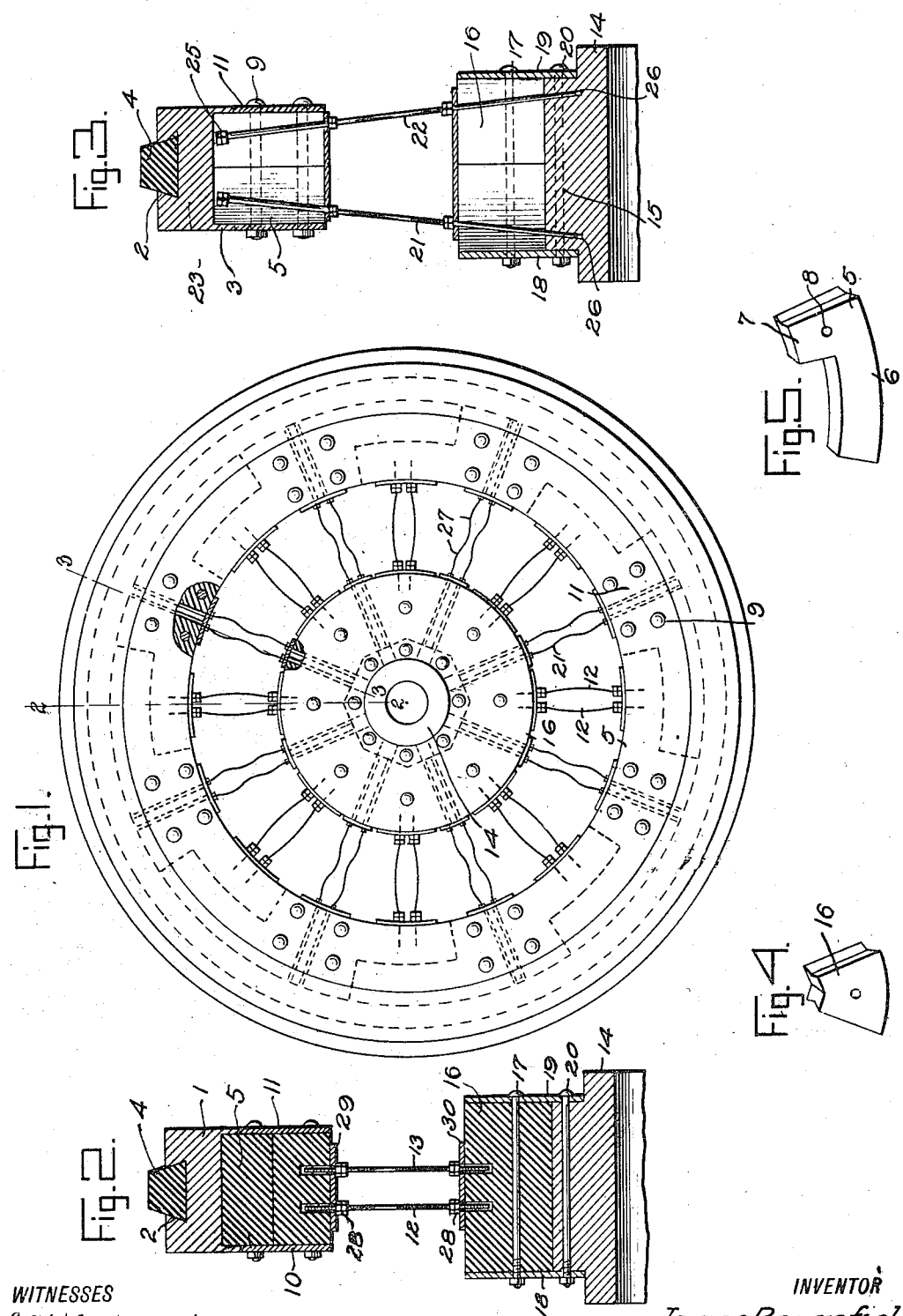
INVENTOR
Isaac Rosenfield.

UNITED STATES PATENT OFFICE.

ISAAC ROSENFIELD, OF ANACONDA, MONTANA.

RESILIENT WHEEL.

1,317,729.  Specification of Letters Patent.  Patented Oct. 7, 1919.

Application filed October 19, 1916, Serial No. 126,469. Renewed March 1, 1919. Serial No. 280,146.

*To all whom it may concern:*

Be it known that I, ISAAC ROSENFIELD, a citizen of the United States, and a resident of Anaconda, in the county of Deerlodge and State of Montana, have invented a new and Improved Resilient Wheel, of which the following is a full, clear, and exact description.

This invention relates to resilient wheels and has for an object to provide an improved construction which is simple, strong and adapted for use with vehicles of any kind.

Another object in view is to provide a resilient wheel in which rubber or other similar cushion members are utilized and the resiliency or spring of bowed metallic spokes is utilized for producing the desired effect.

A still further object in view is to provide the combined use of a rubber or other cushioning member and resilient spokes so arranged that the rubber cushioning member will act for taking up slight jolts or jars and all vibration and the metallic spokes will act in conjunction with the rubber cushioning member for taking up the more or less heavy or great jars, thus producing a very resilient structure under ordinary circumstances and a much stiffer resilient structure for special circumstances.

In the accompanying drawings:—

Figure 1 is a side view partly in section of a wheel embodying the invention.

Fig. 2 is a sectional view through Fig. 1 on line 2—2.

Fig. 3 is a sectional view through Fig. 1 on line 3—3.

Fig. 4 is a perspective view of one of the hub cushioning blocks embodying certain features of the invention.

Fig. 5 is a perspective view of one form of the rim cushioning blocks embodying certain features of the invention.

Referring to the accompanying drawings by numerals, 1 indicates a metallic rim which presents an I-beam structure in cross section, as is clearly shown in Fig. 3, whereby there are produced annular grooves 2 and 3, respectively, groove 2 being designed to receive the outer band or tire 4 of rubber or other suitable material. The groove 3 is designed to receive various bumper or cushioning blocks 5. These blocks are formed of any suitable resilient material, preferably rubber, and are arranged with an arcuate portion 6 having at the end thereof radial lugs 7. An aperture 8 is provided in each of the cushioning members 5 for receiving one of the binding bolts 9 passing through the clamping rings 10 and 11. The bolts 9 and rings 10 and 11 are intended merely for holding the cushioning blocks or members 5 in position so that the same may act as cushioning members for the various spokes 12 and 13 hereinafter further described.

The hub 14 is provided with a flange 15 upon which rest a plurality of cushioning blocks 16 held in place by clamping bolts 17 and side rings 18 and 19. The rings 18 and 19 are rigidly secured to the annular flange 15 by any suitable number of bolts 20, thus forming an annular groove or channel for the various cushioning blocks 16 which are made from rubber or other resilient material.

As shown in Fig. 1, the cushioning blocks 5 are arranged in pairs, each pair being opposite a single block 16 on the hub so that the various spokes 12 and 13 may extend from one set of blocks 5 to one block 16. It will be observed that there are shown two spokes 12 and two spokes 13 associated with each blocks 16, though a greater number might be used if desired. Between each set of blocks 16 are positioned the ends of the respective spokes 21 and 22, there being preferably two spokes 21 and two spokes 22 between each block 16. Lock nuts 25 are arranged on the various spokes 21 and 22 and press against the cushioning blocks 5 so that the spokes are rigidly clamped to a block 5 and cannot move independently of such block.

The inner or hub end of the spokes 21 and 22 are snugly arranged in sockets 26 with their ends normally spaced a short distance from the bottom of the sockets so that when rim 1 is moved inwardly for a short distance the resistance to such movement is caused by the respective spokes 12 and 13 and the cushioning blocks 5 and 16. If the movement of the rim 1 toward the hub 14 continues, then the hub end of the spokes 21 and 22 will press against the hub 14 and resiliently resist further movement of the rim by reason of the fact that the spokes 21 and 22 are provided with bowed portions 27.

It will thus be seen that the first and smaller shocks and vibration are taken up by the spokes 12 and 13 which are bowed as shown in Fig. 1, and by the cushioning blocks 5 and 16, while the greater shocks are absorbed by the spokes 21 and 22 which are of resilient material and are preferably formed with several bowed portions as shown in Fig. 1. The bowing of all of the spokes is in a plane preferably at right angles to the axis of the wheel. The spokes 12 and 13 snugly extend into the rubber blocks 5 and 16 and are caused to press against these blocks by reason of the nuts 28 acting on plates 29 and 30, respectively. Both ends of spokes 12 and 13 are threaded so that these spokes may maintain the blocks 5 and 16 under a continuous compression. It is to be noted that part of the first shock of the wheel will be taken up by the tire and the remaining part taken up by blocks 5 and 16 and the spokes 12 and 13. The tire 4 is preferably restricted in width, as shown more particularly in Figs. 2 and 3, and extends a short distance beyond the rim so as to bite into or engage the earth in such a manner as to prevent skidding of the wheel.

What I claim is:

1. In a resilient wheel of the character described, a hub, a plurality of cushioning members arranged exteriorly thereof, a plurality of spokes extending from said cushioning members, a cushioning member arranged at the outer ends of said spokes, means arranged on said spokes for giving said cushioning members a tendency to move apart, and a rim surrounding said outer cushioning members.

2. A wheel comprising a rim, a hub, a plurality of sets of spokes, a plurality of cushioning members arranged adjacent the rim, a plurality of cushioning members arranged adjacent the hub, the spokes of alternate sets being spaced, said spaced spokes being rigidly connected with said cushioning members and slidingly engaging said hub so that there must be an appreciable movement of the hub toward the rim before the spaced spokes will act, and means arranged on the remaining spokes for maintaining them under tension, whereby the said remaining spokes and said cushioning members will take up the first strain or movement on said rim and said spaced spokes will act as auxiliary supports for the rim.

3. In a resilient wheel of the character described, a hub, a rubber cushioning structure surrounding said hub, a rim, a rubber cushioning structure arranged interiorly of said rim, a plurality of principal spokes having their opposite ends projecting into the resilient structure on the hub and the resilient structure interiorly of the rim, a plate arranged adjacent each end of said principal spokes, means on each of said spokes for pressing said plates against said respective cushioning structures so that the strain will be communicated from one cushioning structure to the other through said spokes, and a plurality of auxiliary spokes extending nearly to said rim and slidingly engaging said hub, said auxiliary spokes being resilient and adapted to take up excessive strains while said cushioning structures and said principal spokes are adapted to take up minor strains.

4. In a wheel of the character described, a hub, a rim, a plurality of principal spokes for connecting said hub and rim, rubber blocks arranged exteriorly of said hub and interiorly of said rim, a plurality of auxiliary spokes connecting said rubber blocks, means on the principal spokes for placing said blocks under compression whereby motion will be communicated from one block to the other through said spokes, said auxiliary spokes and said principal spokes being formed with bowed portions intermediate their length, said bowed portions being resilient.

5. In a wheel of the character described, a hub, a plurality of rubber cushioning blocks arranged on said hub, a rim, a plurality of rubber cushioning blocks arranged on said rim, resilient metallic spokes connecting the blocks on the hub with the blocks on the rim, tensioning means on the spokes for pressing against said blocks, said tensioning means comprising plates fitting against said rubber blocks and adjustable nuts on the spokes, and means acting on said cushioning blocks on said rim and engaging said hub for taking up excessive strains on said rim.

In testimony whereof I have signed my name to this specification in the presence of two subscribing witnesses.

ISAAC ROSENFIELD.

Witnesses:
S. ROSENFIELD,
T. S. ECKHOLM.